United States Patent [19]

Saitou et al.

[11] 4,432,639
[45] Feb. 21, 1984

[54] RECIPROCATIVE ORIGINAL CARRIER LOCKING MECHANISM

[75] Inventors: Masao Saitou, Kamakura; Yasuhiro Iwata, Yokohama; Kohachi Uchida, Sagamihara, all of Japan

[73] Assignee: Tokyo Shibaura Denki Kabushiki Kaisha, Tokyo, Japan

[21] Appl. No.: 306,496

[22] Filed: Sep. 28, 1981

[30] Foreign Application Priority Data

Oct. 31, 1980 [JP] Japan ................................ 55-154399

[51] Int. Cl.³ ............................................. G03B 27/62
[52] U.S. Cl. .................................. 355/75; 355/3 SH; 355/14 SH
[58] Field of Search ................... 355/75, 3 SH, 14 SH

[56] References Cited

U.S. PATENT DOCUMENTS

3,997,262 12/1976 Doi et al. ............................... 355/11
4,297,023 10/1981 Nagoshi ................................ 355/75
4,348,106 9/1982 Suzuki et al. ......................... 355/75

Primary Examiner—Monroe H. Hayes
Attorney, Agent, or Firm—Schuyler, Banner, Birch, McKie & Beckett

[57] ABSTRACT

This invention is directed to a clam shell type image forming device whereby the upper unit is pivotally mounted with respect to the lower unit. Conversely, the upper unit is latched into a lower portion with the lower unit. If desired, however, the upper unit can be rotated to an upper position at a fixed angle. This is desirable, for example, if the operator must remove jammed paper from the device as to, otherwise, repair any defects. The invention utilizes a latching handle which permits the operator to unlatch the upper unit from the lower unit. The handle is not permitted to operate unless the carrier is moved to its predetermined position.

4 Claims, 11 Drawing Figures

RECIPROCATIVE ORIGINAL CARRIER LOCKING MECHANISM

BACKGROUND OF THE INVENTION

This invention relates to an image forming device having a reciprocative original carrier which receives an original document or the other item for copying.

In a conventional copying machine divided into an upper unit and a lower unit, a provision is made for removing paper jammed along the transportation path. In general, the upper unit is pivotally attached to the lower unit thereby permitting the upper unit to be raised to a fixed angle. Upon raising the upper unit, the jammed paper can then be located and removed. Raising the upper unit, however, creates a basic disadvantage with prior art designs. Since the carrier is permitted to move along its reciprocal path uninhibited, the lifting of the upper unit forces the carrier to move downwardly by the action of gravitational force. The original carrier will therefore move downwardly and impact at the farthest position along its path of travel. As a result of the motion of the original carrier, the document, positioned between the glass plate and the cover, will move from its prefixed position on the plate. In fact, the document, in some cases, will protrude or slip out from the carrier. Frequently, therefore, it is necessary for the operator to reposition the document on the surface of the glass plate; an additional step which is time consuming, burdensome and troublesome.

Moreover, due to the impact made when the carrier reaches its farthest position, damage to the device can occur thereby requiring repair. The rapid movement of the carrier can also cause injury to the operator or a bystander who is accidently in its path of travel.

SUMMARY OF THE INVENTION

It is an object of the invention to overcome the prior art disadvantages mentioned above. The invention provides an image forming device having a reciprocative original carrier whereby the upper unit can be raised from the lower unit only when the carrier is moved to a predetermined locking position along the path of travel. When in this position, the carrier will not move even when the upper unit is being raised to its fixed angle.

A further object of this invention is to provide an image forming device whereby the carrier does not move despite the pivoted movement of the upper unit to its fixed angle upper position for permitting access to the transportation path of the paper.

Another object of this invention is to prevent repositioning of the document despite the raising of the upper unit to its upper position.

A still further object of the invention is to prevent impact of the carrier caused by raising the upper unit, thereby preventing possible damage to the unit and injury to the operator or bystander.

Still another object of the invention is to provide a carrier locking mechanism which is simple in construction, high in reliability and low in cost.

This invention is directed to a clam shell type image forming device whereby the upper unit is pivotally mounted with respect to the lower unit. Conversely, the upper unit is latched into a lower portion with the lower unit. If desired, however, the upper unit can be rotated to an upper position at a fixed angle. This is desirable, for example, if the operator must remove jammed paper from the device as to, otherwise, repair any defects. The invention utilizes a latching handle which permits the operator to unlatch the upper unit from the lower unit. The handle is not permitted to operate unless the carrier is moved to its farthest righthand position (i.e., the predetermined locking position).

The handle is permitted to operate by the action of a locking lever coupled to the handle. This lever is positioned adjacent the path of travel of the carrier in such a manner that it can be projected into the path only if the carrier is moved to its farthest righthand position (i.e., predetermined locking position). All other positions of the carrier prohibit projection of the lever and, therefore, prevents movement of the latching handle to unlatch the upper and lower units.

The placement of the lever is such that the projection into the path of travel snugly locks the carrier in its farthest righthand position. Any attempt at all to move the carrier toward the lever will be prevented by the latch contacting the left side edge of the carrier. In this way, any accidental jarring of the carrier which would otherwise result in movement of the document from its position on the glass plate will be prevented.

Finally, the invention utilizes a cover locking mechanism which is activated by the unlatching movement of the handle. This mechanism incorporates a cover locking arm and tab which presses the cover firmly against the document and glass surface while the carrier is in its predetermined locking position. As a result, an additional safeguard is provided to prevent any movement of the document from its position on the glass plate.

Other objects and features of the present invention will be apparent from the following description taken in connection with the accompanying drawings.

DETAILED DESCRIPTION OF THE PREFERRED EMBODIMENTS

When reference is made in the present application to a copying machine, it should be clear that the present invention can be employed with any image forming device including, for example, facsimile machines.

Figure 1:
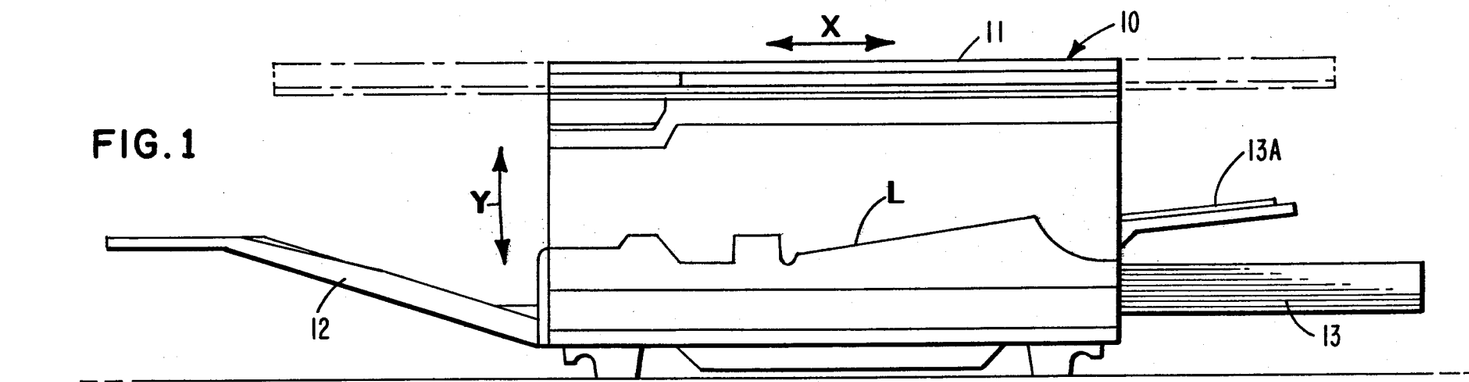
FIG. 1 is a front view of a conventional copying machine employing the carrier locking mechanism according to this invention.

As shown in FIG. 1, an original carrier 11 of a copying machine 10 freely reciprocates in the X direction by a drive mechanism (not shown). The carrier moves between a first predetermined position and a second predetermined position. The second predetermined position corresponds to the farthest righthand position of the carrier. A more detailed discussion of the remaining parts shown in FIG. 1 will be made with reference to FIG. 2.

Figure 2:
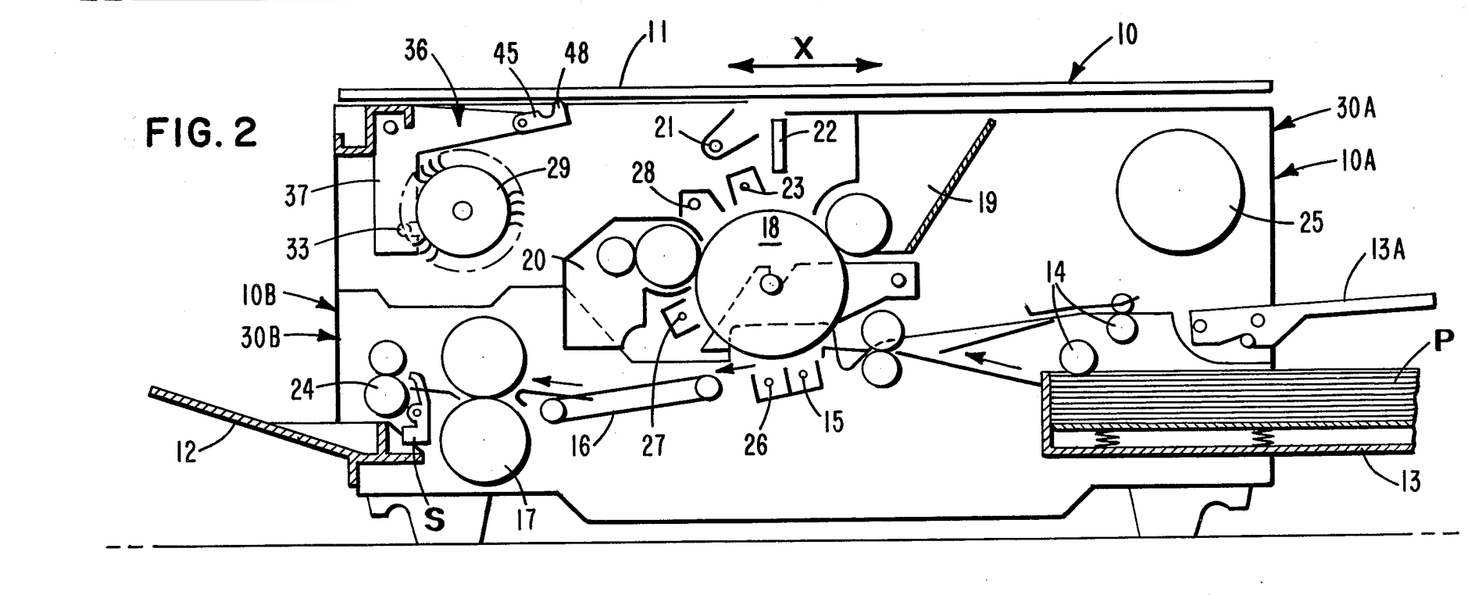
FIG. 2 is a sectional view of the conventional copying machine shown in FIG. 1 with the upper and lower units locked.

As shown, a copy receiving tray 12 is removably mounted on the left side of copying machine 10. A cassette 13 for storing copying papers P and a manual feed guide member 13A for manually feeding papers are provided on the right side. A paper supplying mechanism 14 is coupled to cassette 13 and guide members 13A for feeding papers stored in the cassette 13 and feed guide member 13A. A transfer mechanism 15 transfers the developer (i.e., toner) from a photosensitive member 18 to copying paper P. Transportation mechanism 16 transports the transferred copying paper P to a fusing mechanism 17 for fusing transferred toner on the paper.

Photosensitive member 18 comprises a selenium drum which is rotatably mounted. Spaced around photosensitive member 18 are the following units: a developer unit 19 for storing toner; a cleaning device 20 for cleaning the residual toner from photosensitive member 18; an illuminating system 21 for illuminating the original carried by an original carrier 11; a focusing light transmitter 22 for transmitting reflected illumination from the original to photosensitive member 18; and, a charger 23 for uniformly charging the static charge on the photosensitive member 18. Further, several additional elements are spaced around photosensitive member 18: a paper separator 26 which causes cornona discharge to separate the copying paper P; a discharger 27 for removing the charge from photosensitive member 18 after it has transferred the image to copying paper P; and, an exposure lamp 28 for uniformly illuminating photosensitive member before charging. In addition, there is provided a transportation roller 24 for transporting the fused copying paper P to copy receiving tray 12 and a motor 25 for reciprocally moving original carrier 11 and rotating photoconductive member 18. Also shown is a cooling device 29 for cooling the fusing mechanism 17. Paper detector S is provided adjacent tray 12 for checking the normal exiting of the fused copying paper to the tray 12.

Figure 3:
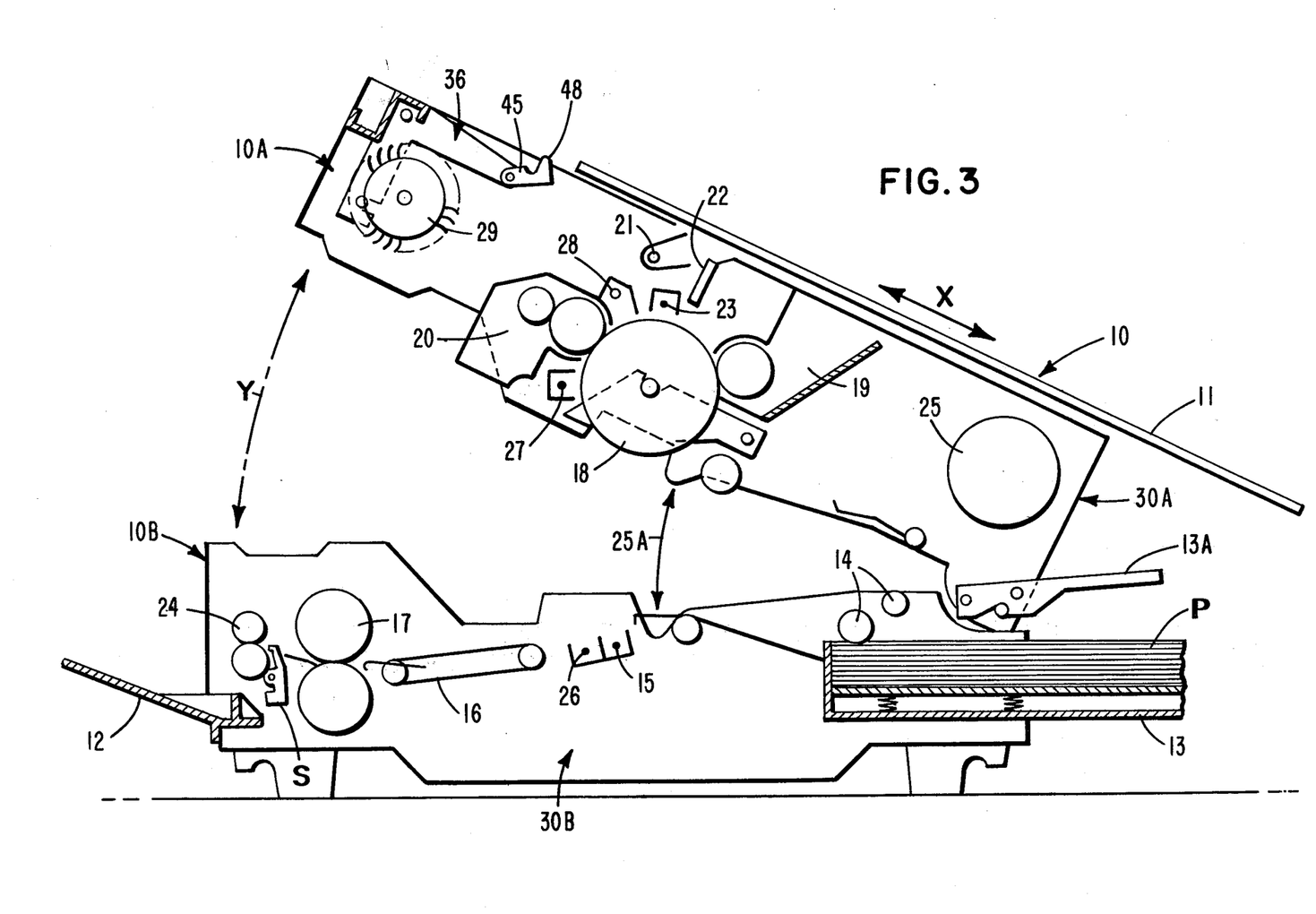
FIG. 3 is a sectional view of the conventional copying machine shown in FIG. 1 with the upper unit raised to its upper position permitting access to the interior of the machine.

As shown in FIGS. 2 and 3, the copying machine is constructed of two units, an upper unit 10A and lower unit 10B. The upper unit has an upper frame 30A while the lower unit has a lower frame 30B. By rotating a locking member 36 via a latching handle 42 (see FIG. 4), these units can be unlatched. The upper unit can be raised upwardly to a desired angle (for example, 25A) in the direction of arrow Y, pivoting about a hinge point. The upper and lower units are separated along line L (see FIG. 1). Therefore, paper P can be easily removed if it becomes jammed along the transportation path.

Figure 4:
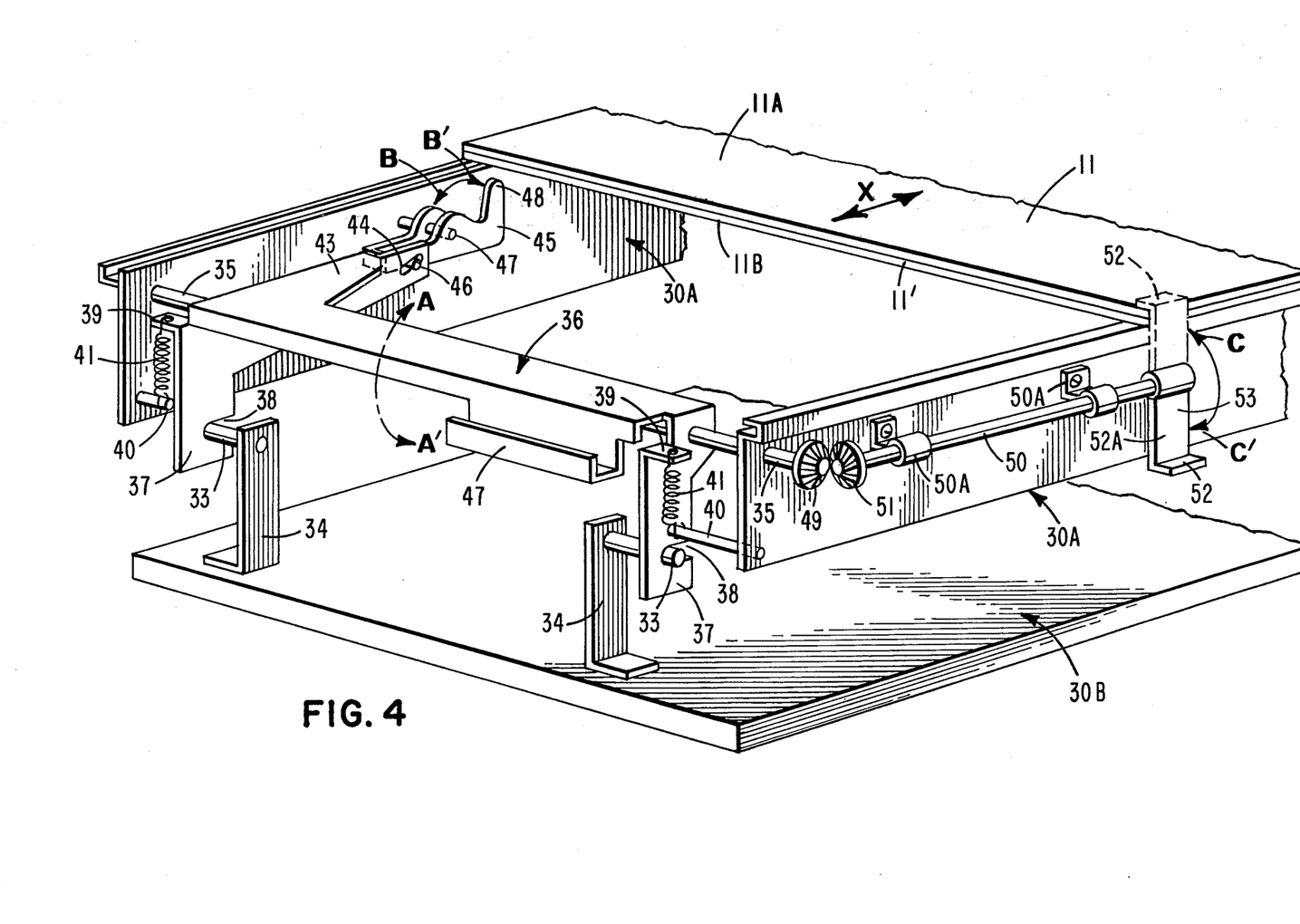
FIG. 4 is a perspective view showing the details of the carrier locking mechanism of this invention.

FIG. 4 shows in detail the construction of the carrier locking mechanism which can be incorporated on conventional reciprocating carrier copying machines. As shown, a pair of latching plates 34 having outwardly oriented horizontal latching pins 33 are fixed to lower frame 30B. A locking plate 36 including an integrally formed latching handle 42 is pivotally attached to upper frame 30A. Locking plate 36 is attached to frame 30A via latching shaft 35 which permits pivotal movement of plate 36 in the direction of arrow A—A'. The end portions of unlocking plate 36 are bent downwardly forming locking arms 37. A latching notch 38 is formed in each latching arm 37 which receives each locking pin 33. The upper portion of latching arms 37 include spring tabs 39. Each spring tab 39 receives one end of pivoting spring 41; the other end of pivoting spring 41 is connected to spring pin 40, fixed to upper frame 30A. Upon rotating latching handle 42 in direction A (see FIG. 5), arm 37 will be disengaged from latching pin 33 to permit upper unit 10A to be raised from lower unit 10B for access into the machine. Upon releasing handle 42, plate 36 rotates in the reverse direction A' by the force of spring 41 causing latching arms 37 to return to its original vertical orientation. As a result, notch 38 of arms 37 will engage latching pin 33 when upper unit 10A is moved in contact with lower unit 10B thereby again latching the upper and lower units (see FIG. 5).

The left portion of locking member 36 includes a horizontal rearwardly oriented coupling arm 43 for coupling latching handle 42 to a locking lever 45. The rearward end of coupling arm 43 includes slot 44 which receives a coupling pin 46 fixedly attached to one end of locking lever 45. Lever 45 is pivotally attached to upper frame 30A by pivoting pin 47 which permits pivotal movement in the direction of arrow B—B'. As a result, the movement of handle 42 in direction A causes movement of lever 45 in direction B. The pivotal movement of lever 45, however, can be prevented by an upwardly extending lever arm 48 integrally connected to lever 45. Lever arm 45 is positioned to project in the path of travel of original carrier 11 when lever 45 rotates in direction B and carrier 11 is positioned at its predetermined locking position (see FIGS. 4, 6).

Figure 6:
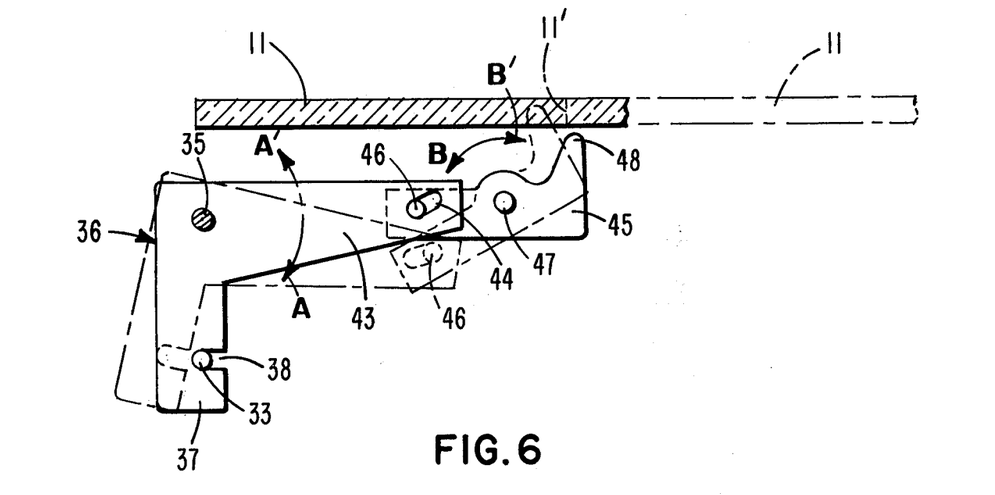
FIG. 6 is the side view showing the carrier's locking lever and the unit's latching arm shown in FIG. 4.

As shown in FIG. 6, if carrier 11 is not placed in its predetermined locking position, its lower surface will impede the pivotal movement of lever 45. Consequently, the requisite movement of unlocking member 36 in direction A to disengage notch 38 from latching pin 33 will be prevented. As can be seen, the instant invention employes a combination of elements to permit unlatching the upper unit 10A from the lower unit 10B only if carrier 11 is placed in its predetermined locking position—a position which does not impede the pivotal movement of locking lever 45. This position is selected to be the farthest rightmost position of carrier 11. In this position, the lower surface of carrier 11 does not prevent the pivotal movement of arm 48 into the path of travel of carrier 11.

As shown in FIG. 6, lever arm 48 when projecting in the carrier's path of travel (i.e., when the carrier is positioned at its farthest rightmost position) is positioned to snuggly contact edge 11' of carrier 11. Consequently, any accidental contact with carrier 11, when the upper unit 10A is raised, will not cause carrier movement since projected arm 48 prevents movement along the X direction. This feature of the invention offers a safeguard of preventing movement of the carrier due to accidental jarring of the carrier when the upper unit is raised.

Figure 5:
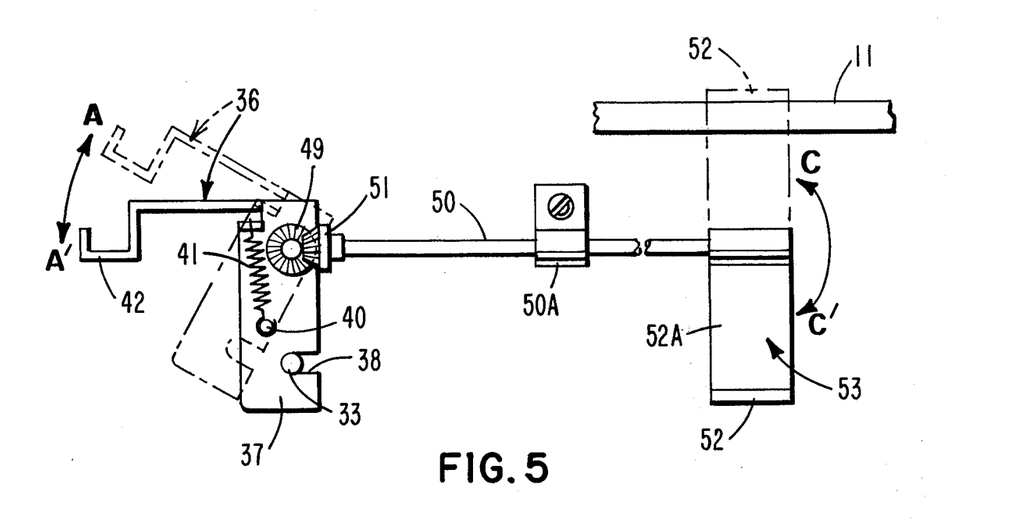
FIG. 5 is a side view showing the details of the cover locking mechanism shown in FIG. 4.

FIGS. 4 and 5 show, in detail, the construction of the cover locking mechanism 53 which depresses cover 11A against glass plate 11B while the upper unit 10A is raised. As a result, an addition safeguard is provided to prevent any movement of the document from its position on the glass plate. At one end of latching shaft 35, a first bevel gear 49 is provided. First bevel gear 49 engages with a second bevel gear 51 attached to the end of a locking shaft 50. Shaft 50 is fixed to upper frame 30A and positioned in the X direction by shaft holders 50A. The other end of shaft 50 receives cover locking mechanism 53 having cover locking arm 52A and cover locking tab 52. Cover locking arm 52A is constructed to be rotated in the direction of arrow C'—C by the pivotal movement of locking member 36. As previously discussed, latching shaft 35 is fixed to each arm 37 so that movement of latching handle 42 rotates shaft 35. The operational engagement of bevel gears 49, 51 transmit this rotational movement to shaft 50. Consequently, the movement of plate 36 in direction A, unlatching the lower and upper units, causes the rotational movement of cover locking arm in the direction C and thereby depressing cover 11A against glass plate 11B.

At a time when an operator will try to open copying machine 10, he will try to rotate handle 42, against the force of pivoting spring 41, in the direction of arrow A. If in this case, carrier 11 does not stop at the position indicated in FIG. 4 (i.e., its predetermined unlatching position) but stops at a different position, lever arm 48 of lever 45 will contact the lower surface of original carrier 11. Therefore, lever 45 will be prevented from rotating in direction B and unlocking member 36 will, likewise, be prevented from rotating direction A. As a result, notch 38 will remain engaged with latching pin 33 making it impossible to open upper unit 10A in direction of arrow Y (see FIG. 3).

However, if carrier 11 is moved to the predetermined locking position, indicated in FIG. 4, unlocking member 36 can now be rotated in direction A. That is, coupling arm 43 will rotate in the direction of arrow A causing locking lever 45 to rotate in direction B. Since the lower surface of cover 11 does not now prevent the movement of lever arm 48, it continues to rotate in the path of carrier 11 thereby permitting latching arm 37 to continue to rotate in direction A. As a result, notch 38 will disengage latching pin 33 thereby unlatching the upper and lower units. As locking member 36 moves in direction A, it will pass a dead-center point of spring 41 which causes member 36 to remain in the unlatched state. This dead-center point occurs unless spring pin 40, spring tab 39 and shaft 35 are aligned. Projection 48 of lever 45, consequently, snugly contacts edge 11' of original carrier 11; therefore, carrier 11 is unable to move from its predetermined position in the direction of arrow X. Therefore, an an accidental jarring of carrier 11 will not cause its movement and the concomitant movement of the document from its position between carrier 11A and glass plate 11B.

The uninterrupted rotation of member 36, causes the rotation of shaft 50 via level gears 49, 51. As a result, cover locking arm 52A, attached to the other end of shaft 50, rotates in direction C pressing cover 11A firmly against glass plate 11B (FIGS. 4, 5: as shown in dotted lines). Cover locking mechanism 53, therefore, prevents the document from moving from its fixed position on glass plate 11B, while upper unit 10A is in the inclined state.

Figure 7A:
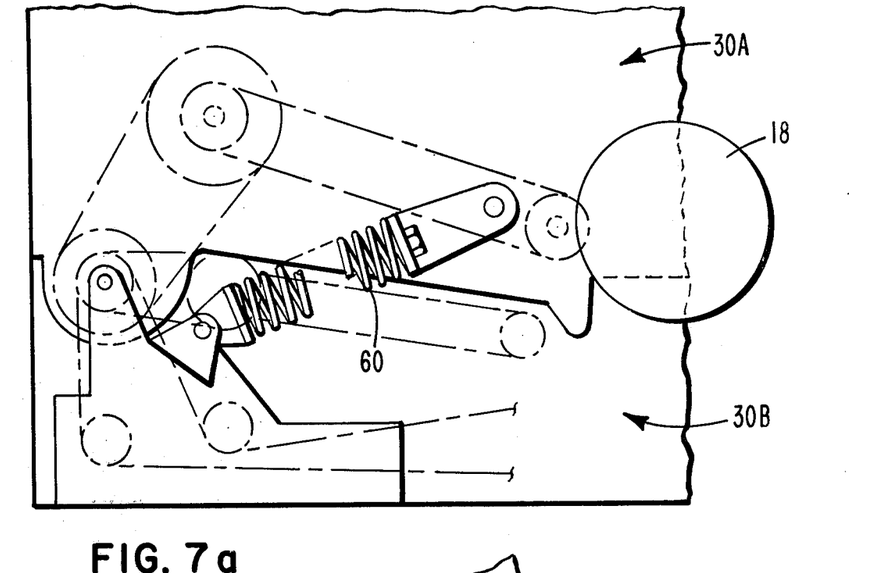
FIGS. 7(a) and 7(b) are views explaining the operation of the upper and lower unit lifting spring.
Figure 7B:
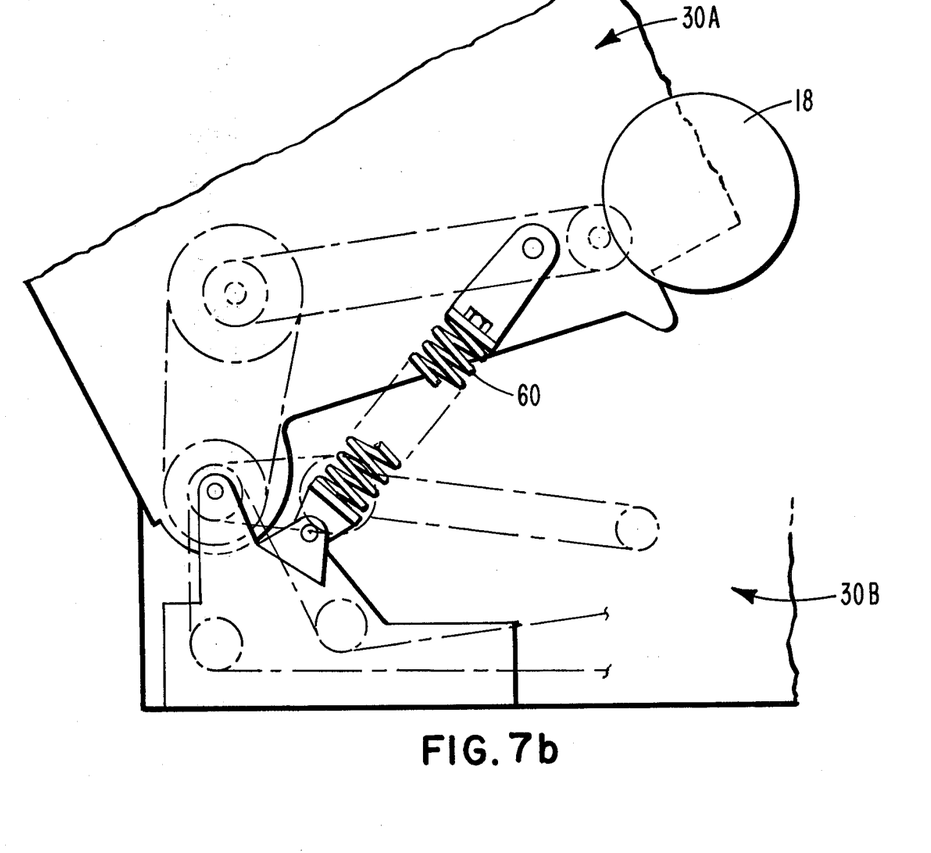

As shown in FIGS. 7(a) and 7(b), upper frame 30A and lower frame 30B are coupled by a lifting spring 60 which aids in raising the upper frame from the lower frame when unlocking occurs. Spring 60 also aids in keeping upper unit 10A raised.

Upper unit 10A is kept open and original carrier 11 is mounted in its fixed position permiting the operator, with both hands, to remove the jammed paper or to repair the machine. After the repairs are completed, the operator must lower the upper unit 10A to contact lower unit 10B and move handle 42 in the direction of arrow A. Once the dead-center point of spring 41 is passed, the force of spring 41 will cause locking member 36 to continue rotating in the direction of arrow A'. Consequently, notch 38 will then engage pin 40 causing the latching of the upper and lower units. The continued rotation of member 36 will cause locking lever 45 to rotate in the direction of arrow B'. As a result, lever arm 48 will retract below the path of travel of original carrier 11 to permit its movement.

Figure 8:
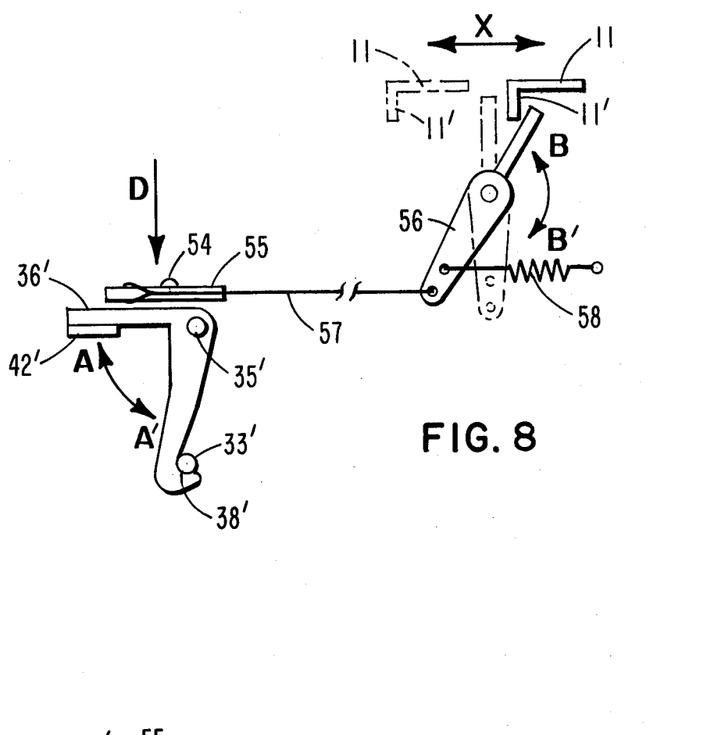
FIG. 8 is a side view of another embodiment of the carrier locking mechanism of this invention.
Figure 9A:
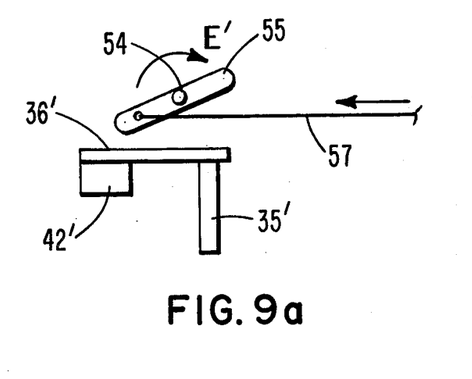
FIGS. 9(a) and (b) are top views of the embodiment of the carrier locking mechanism shown in FIG. 8.
Figure 9B:
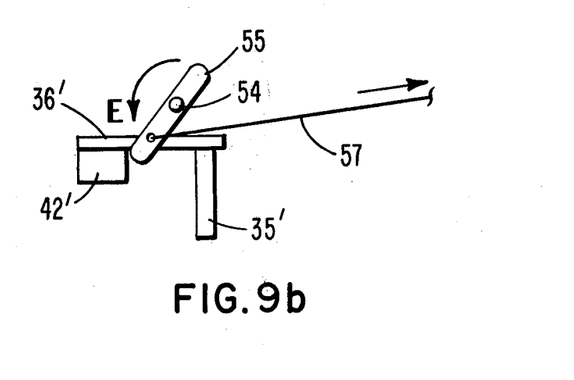

FIGS. 8, 9(a) and 9(b) show another embodiment of the carrier locking mechanism of this invention. FIGS. 9(a) and 9(b) are plan views of the mechanism seen from the direction D of FIG. 8. A locking control lever 55 is pivotally attached to rotate in the direction E—E' about a pin 54 secured to the upper frame 30A (not shown). Operatively associated with lever 55 is latching member 36', having an operating handle 42', which is pivotally attached to upper frame 30A by a pivot pin 35'. As shown, member 36' includes a notch 38' which engages a horizontal latching pin 33' fixed to lower frame 30B (not shown). As shown in FIG. 9(a), if lever 55 is rotated to its retracted position, member 36' can pivot in direction A thereby disengaging notch 38' from pin 33'. If, on the other hand, lever 55 is rotated to its extended position latching member 36' (see FIG. 9(b)), is prevented from pivoting to disengage notch 38' from pin 33'.

One end of a locking wire 57 is connected to an end of control lever 55, while the other end of wire 57 is connected to a locking lever 56 pivotally attached adjacent the predetermined locking position of original carrier 11. The upper end of lever 56 is positioned to contact the inner surface of end 11' of carrier 11.

As shown in dotted lines (FIG. 8), spring 58 forces lever 56 in direction B, while the positioning of carrier 11 in its predetermined locking position forces lever 56 in direction B'. When original carrier 11 moves in the X direction from the solid line position to the dotted line position (see FIG. 8), sensing lever 56 is rotated in direction B. As a result, lever 56, through wire 57, rotates control lever 55 in direction E causing one end of the control lever to extend in the rotational path of latching lever 36' (see FIG. 9(b)). Therefore, the rotation of member 36' in the direction of arrow A is obstructed by control lever 55, thereby preventing the opening of machine 10. If, however, original carrier 11 returns to its predetermined locking position, lever 56 will rotate in direction B' due to its contact with the inner surface of end 11'. As a result, control lever 55 will rotate in direction E', thereby retracting control lever 55 from the rotational path of member 36' (see FIG. 9(a)). Consequently, member 36' can be rotated in the direction of arrow A which disengages notch 38' from pin 33'. Therefore, the upper frame 30A can be unlocked from the lower frame 30B.

Since obvious changes may be made in the illustrated embodiment of the device without departing from the scope of the invention, it is intended that all matter contained herein be interpreted as illustrative and not in a limiting sense. For example, notch 38 can be placed in lower frame 30B while a latching pin, engaging notch 38, can be fixed to upper frame 30A.

We claim:

1. An image forming device having an upper and lower unit wherein the upper unit is hingedly attached to the lower unit to permit access to the interior of the machine, the upper unit comprises a reciprocative type carrier which moves along a path of travel which includes a predetermined position, said image forming device comprising:

means for pivotedly attaching said upper unit to said lower unit;

a latching means for latching said upper unit to said lower unit;

a locking means which projects in the path of said carrier to prevent the movement of said carrier from said predetermined position when said latching means is unlatched; and actuator means having a first portion and a second portion, said first portion being connected to said latching means to operate said latching means, said locking means being connected to said second portion to prevent said actuator means from operating said latching means except when said carrier is in said predetermined position.

2. The image forming device as claimed in claim 1 wherein the carrier comprises a glass plate which receives an original and a cover for depressing the original to the glass plate, and further comprising a cover locking means, coupled to the latching means, forceably depressing the cover against the glass plate when the latching means is unlatched.

3. The image forming device as claimed in claim 1 wherein said latching means includes a handle for permitting an operator to unlatch the latching means for raising the upper unit from the lower unit when said cover is in said predetermined position.

4. An image forming device having an upper and lower unit wherein the upper unit is hingedly attached to the lower unit to permit access to the interior of the machine, the upper unit comprises a reciprocative type carrier which moves along a path of travel which includes a predetermined position, said image forming device comprising:

means for pivotedly attaching said upper unit to said lower unit;

a latching means for latching said upper unit to said lower unit;

a locking means, coupled to said upper unit and operatively associated with said carrier to permit unlatching of said latching means when said carrier is in said predetermined position and to prevent said unlatching when said carrier is away from said predetermined position; and said carrier comprising a glass plate which receives an original and a cover for depressing the original to the glass plate, and further comprising a cover locking means, coupled to said latching means, forceably depressing said cover against said glass plate when said latching means is unlatched.

* * * * *